(12) United States Patent
Eerola et al.

(10) Patent No.: US 6,850,558 B1
(45) Date of Patent: Feb. 1, 2005

(54) SPREAD SPECTRUM RECEIVER

(75) Inventors: Ville Eerola, Julkujarvi (FI); Tapani Ritoniemi, Peräseinäjoki (FI)

(73) Assignee: u-Nav Microelectronics Corporation, Irvine, CA (US)

( * ) Notice: Subject to any disclaimer, the term of this patent is extended or adjusted under 35 U.S.C. 154(b) by 773 days.

(21) Appl. No.: 09/689,681

(22) Filed: Oct. 13, 2000

(30) Foreign Application Priority Data

Oct. 13, 1999 (FI) ............................................. 19992208
Mar. 7, 2000 (FI) .............................................. 2000520

(51) Int. Cl.⁷ ......................... H04B 15/00; H04K 1/00; H04L 27/30
(52) U.S. Cl. ....................... 375/150; 375/147; 375/149; 375/142; 375/145
(58) Field of Search ................ 375/141–145, 375/147–153

(56) References Cited

U.S. PATENT DOCUMENTS

| | | | |
|---|---|---|---|
| 4,701,934 A | * 10/1987 | Jasper | 375/147 |
| 4,785,463 A | * 11/1988 | Janc et al. | 375/147 |
| 5,377,225 A | 12/1994 | Davis | |
| 5,640,416 A | 6/1997 | Chalmers | |
| 5,761,239 A | 6/1998 | Gold et al. | |
| 5,903,595 A | 5/1999 | Suzuki | |
| 5,920,589 A | 7/1999 | Rouquette et al. | |
| 5,933,447 A | 8/1999 | Tran et al. | |
| 5,999,561 A | 12/1999 | Naden et al. | |
| 6,728,325 B1 | * 4/2004 | Hwang et al. | 375/355 |
| 6,744,809 B2 | * 6/2004 | Lomp et al. | 375/149 |

FOREIGN PATENT DOCUMENTS

| | | |
|---|---|---|
| EP | 0 772 305 A2 | 5/1997 |
| EP | 0 855 796 A2 | 7/1998 |
| EP | 0 874 471 A2 | 10/1998 |
| EP | 0 886 386 A2 | 12/1998 |
| EP | 0 924 532 A2 | 6/1999 |
| EP | 0 924 871 A2 | 6/1999 |
| EP | 0 944 178 A2 | 9/1999 |
| EP | 0 772 305 A3 | 12/2001 |
| EP | 0 855 796 A3 | 7/2002 |
| EP | 0 886 386 A3 | 10/2002 |
| GB | 2 315 647 | 2/1998 |

OTHER PUBLICATIONS

Bert Gyselinckx et al., "A 4*2.5Mchip/s Direct Sequence Spread Spectrum Receiver with Digital IF and Integrated ARM6 Core," IEEE 1997 Custom Integrated Circuites Conference, pp. 461–464.

Bert Gyselinckx et al. "A 4*2.5Mchip/s Direct Sequence Spread Spectrum Receiver with Digital IF and Integrated ARM6 CORE." IN:IEEE 1997 Custom Integrated Circuits Conference, pp. 461–464.

* cited by examiner

*Primary Examiner*—Phuong Phu

(57) ABSTRACT

The invention relates to a digital receiver part of a spread spectrum receiver, to which receiver part an intermediate-frequency signal ($S_{in}$) is applied, and from whose output a carrier and code demodulated signal ($S_{out}$) is obtained, comprising a code mixer (204) for code demodulation of the signal by means of a local spreading code replica, a carrier mixer (202) for carrier demodulation of the signal by means of a local carrier replica, and first decimation means (305). The receiver part of the invention is characterized in that said code mixer (204) is arranged to precede said carrier mixer (202) on the signal path, said first decimation means (305) are arranged between said code mixer (204) and said carrier mixer (202), and the output of the carrier mixer (202) is functionally connected as an output ($S_{out}$) of the digital receiver part.

19 Claims, 7 Drawing Sheets

PRIOR ART

Fig 2C
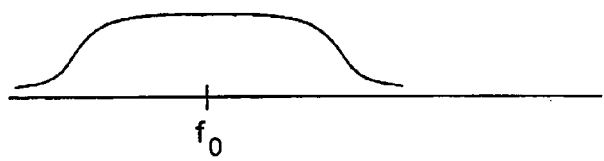
Fig 2D
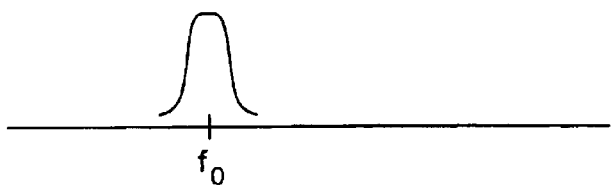
Fig 2E
Fig 2F
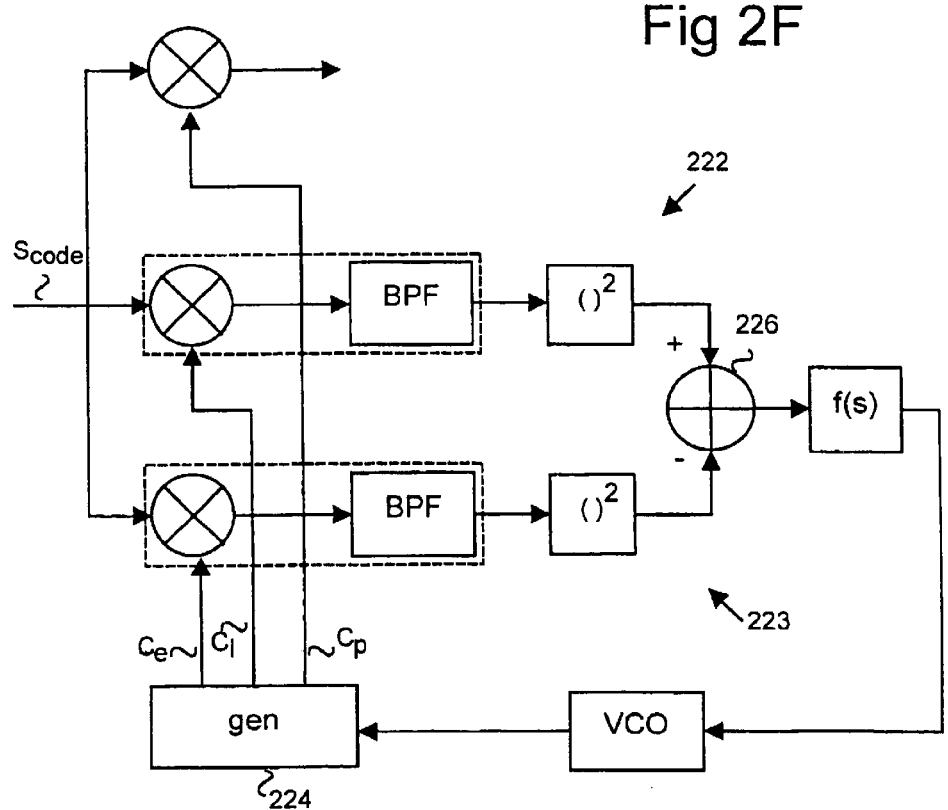
PRIOR ART

SPREAD SPECTRUM RECEIVER

BACKGROUND OF THE INVENTION

The invention relates to a spread spectrum receiver and particularly to stepwise decimation in a spread spectrum receiver.

In spread spectrum systems, the bandwidth used for transmitting a signal is substantially wider than is required for the data to be transmitted. The spectrum of a signal is spread in the transmitter by means of a pseudo-random spreading code, which is independent of the original data. In the receiver, a code replica, which is an identical copy of said spreading code, is used to narrow the spectrum of a signal. Spread spectrum systems can be coarsely divided into direct sequence (DS) spread spectrum systems and frequency hopping (FH) spread spectrum systems. In frequency hopping systems, the transmission frequency is varied in accordance with a pseudo-random spreading code within the limits of the available bandwidth, i.e. hopping occurs from one frequency to another. In direct sequence systems, the spectrum is spread to the available bandwidth by shifting the phase of the carrier in accordance with a pseudo-random spreading code. The bits of a spreading code are usually called chips as distinct from actual data bits.

FIG. 1A is a block diagram of a spread spectrum system based on a direct sequence, a transmitter 101 comprising not only a data modulator 104, but also a spreading code modulator 106 for spreading a transmitted spectrum by means of a spreading code. A receiver 102 comprises a despreading modulator 108, which operates with a spreading code replica identical to said spreading code and correlates a received signal with said spreading code replica. If the spreading code and the spreading code replica generated in the receiver are identical, and the spreading code replica and the spreading code included in the received signal are in phase, a data modulated signal preceding the spreading is obtained from the output of the despreading modulator 108. At the same time, any spurious signals are spread. A filter 110, which succeeds the despreading modulator 108, lets the data modulated signal through, but removes most of the power of a spurious signal, which improves the signal-to-noise ratio of the received signal.

FIG. 1B shows a prior art spread spectrum receiver. A received signal $S_{RF}$ is mixed by multipliers 112 and 114 with a sine-phased and cosine-phased component generated by a local oscillator 116, and filtered with low-pass filters 118 and 120 to generate intermediate-frequency I_if (in-phase) and Q_if (quadrature) signals. The I_if and Q_if signals are then subjected to analog-to-digital conversion in A/D converters 122 and 124, and applied to a digital receiver part 126, in which code and carrier demodulation is performed, and whose output is further connected to a data demodulator (not shown) which performs data demodulation to the signal.

FIGS. 2A and 2B are block diagrams of two such prior art implementations of the digital receiver part of a spread spectrum receiver based on direct sequence spreading that are usable as the digital receiver part 126 of FIG. 1B. The double lines in the block diagrams denote I and Q signals. In the implementation of FIG. 2A, an incoming intermediate-frequency signal $S_{in}$ is first multiplied by a local carrier replica generated in a frequency generator 203 using a carrier mixer 202 to remove the carrier and the Doppler shift, whereupon it is multiplied in a code mixer 204 by a local spreading code replica generated by a code generator 207 controlled by a frequency generator 205. The multiplication by the spreading code replica provides despreading and narrows the spectrum of the signal. Next, the narrowband signal obtained from the code mixer 204 is filtered with a low-pass filter 206 to remove noise and interference, and the sampling frequency of the low-pass filtered signal is lowered to a frequency according to the spectrum of the data modulation with a decimator 208. Signal $S_{out}$ obtained from the decimator 208 is applied to carrier and code tracking means 212 and 214 and to a data demodulator (not shown) which performs data demodulation to the signal.

FIG. 2C shows the spectrum shape of a wideband incoming signal $S_{in}$ at an intermediate frequency $f_{IF}$. FIG. 2D shows the spectrum shape of a signal obtained from the output of the carrier mixer 202 and down-converted to base frequency. FIG. 2E, in turn, shows the spectrum shape of a narrowband signal obtained from the output of the code mixer 204. However, FIGS. 2C to 2E are only intended to illustrate the shape of the spectrum of a signal, and not to present the actual spectrum of a signal.

The implementation of FIG. 2B is functionally identical to that of FIG. 2A. In this implementation, a local carrier replica, and a spreading code replica are combined in a mixer 213 to generate a local signal replica, and the incoming signal $S_{in}$ is multiplied by this signal replica in a mixer 215. Otherwise, the signal processing corresponds to the implementation of FIG. 2A. This implementation is in use particularly in systems based on analog components, since it minimizes the number of components required on the signal path.

The implementation of FIG. 2A is widely used. The implementation of FIG. 2A is preferable to that of FIG. 2B, because spread spectrum receivers usually have to comprise several out-of-phase signal paths, starting from the multiplication by the spreading code replica, to enable the implementation of spreading code tracking. Spreading code tracking can be implemented for example with a correlator structure shown in FIG. 2F and comprising two out-of-phase signal paths 222 and 223, in which an incoming signal $S_{code}$ freed from carrier modulation is correlated with an early $C_0$ and late $C_1$ spreading code replica generated locally with a code generator 224. A signal depending on the phase difference of the local spreading code replica and the code included in the signal $S_{code}$, is obtained from the output of an adder 226, and this signal is used to adjust the phase of the spreading code replica in the right direction. Spreading code tracking is typically carried out separately for I and Q signals, i.e. the number of required components is double compared with the structure of FIG. 2F.

A common feature in prior art implementations is that the carrier and the spreading code are removed at the same sampling frequency and that out-of-phase signal paths are processed in parallel.

BRIEF DESCRIPTION OF THE INVENTION

An object of the invention is to provide a digital receiver part for a spread spectrum receiver so as to lower the power consumption of the spread spectrum receiver. The invention also relates to a spread spectrum receiver of the like device, which uses the digital receiver part of the invention. The objects of the invention are achieved with a digital receiver part and a spread spectrum receiver, which are characterized by what is stated in the independent claims. The preferred embodiments of the invention are disclosed in the dependent claims.

The invention is based on stepwise decimation in the receiver so that the sampling frequency used at each particular time is as low as possible. This allows the number of high-speed signal processing blocks to be minimized, resulting in minimal power consumption.

In accordance with the invention, to narrow the spectrum of a signal, the signal at an intermediate frequency is first mixed with a spreading code replica to perform code demodulation. Decimation for lowering the sampling rate is the next step, followed by removal of the carrier by mixing the signal with a carrier replica. The lower sampling frequency allows the components carrying out removal of the carrier to be timed at a frequency lower than that in prior art solutions, and/or the removal of the carrier to be time multiplexed for several signal paths. If, after removal of the carrier, the sampling frequency of the signal is still higher than the sampling frequency required by data demodulation, a further lowering of the sampling frequency (i.e. decimation) within the limits set by the bandwidth of data modulation before data demodulation.

Generally, the solution of the invention is more complex than prior art solutions, in which the signal processing for removing carrier and code is carried out at the same sampling frequency, but the final implementation is not substantially more complex and does not require substantially more components than prior art solutions. In addition, the solution of the invention allows the carrier demodulation of out-of-phase signal paths in a time-multiplexed manner, which reduces the number of required components.

The invention is suitable for digital implementations. The solution is particularly advantageous in implementations in which the intermediate frequency of an intermediate-frequency signal coming to a digital receiver part, and the bandwidth required by data demodulation are less than the bandwidth required by the spreading code. This often materializes in digital CDMA (Code Division Multiple Access) systems, in which the last intermediate frequency generated by the radio part is low.

An advantage of the digital receiver part of the spread spectrum receiver and the spread spectrum receiver of the invention is optimized power consumption. A further advantage of the invention is that the components used for carrier demodulation can be timed at a lower frequency, and that time multiplexing is possible.

BRIEF DESCRIPTION OF THE FIGURES

The invention will now be described in greater detail by means of preferred embodiments with reference to the attached drawings, of which FIGS. 2C, 2D and 2E show the spectrum shape of a signal at different points of the digital receiver part shown in FIG. 2A, FIG. 2F shows a prior art correlator structure.

DETAILED DESCRIPTION OF THE INVENTION

Figure 1A:
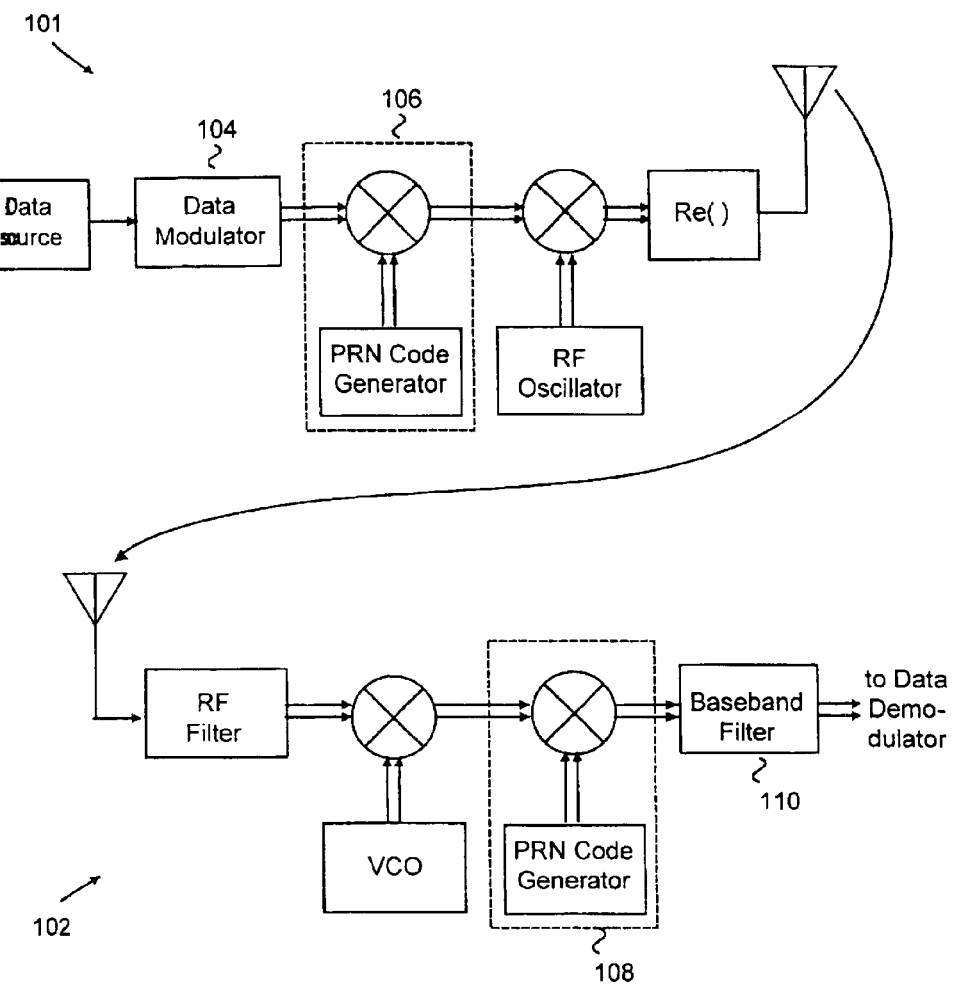
FIG. 1A is a block diagram of a spread spectrum system based on a direct sequence.
Figure 1B:
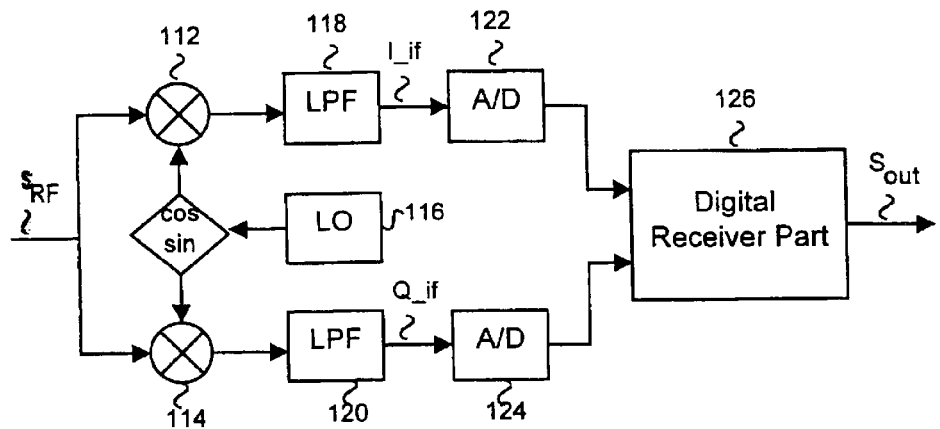
FIG. 1B is a block diagram of a prior art spread spectrum receiver based on a direct sequence.
Figure 3A:
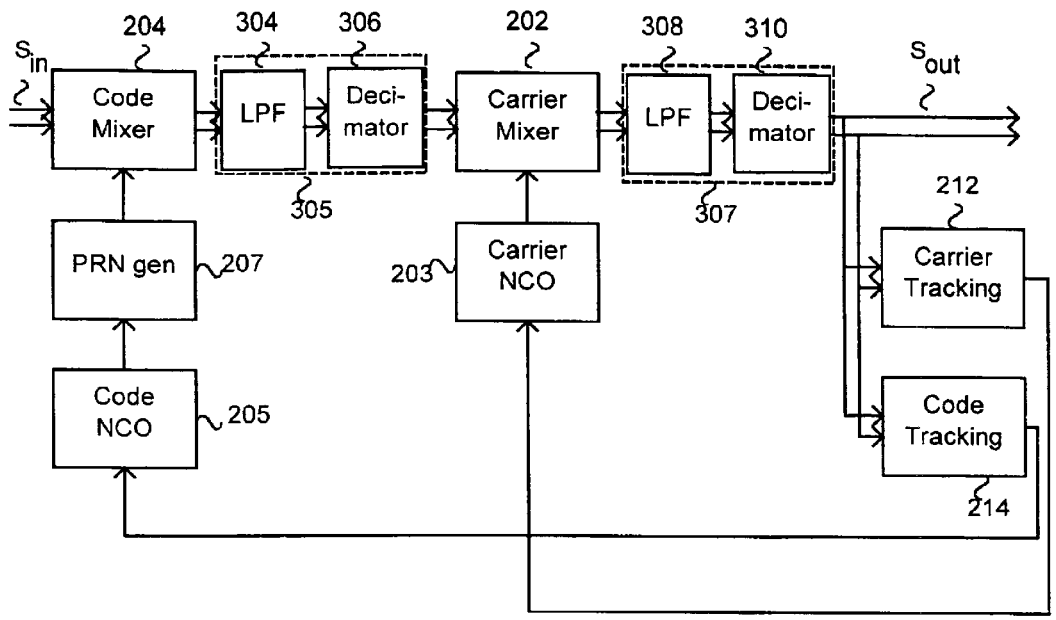
FIG. 3A is a block diagram of the digital receiver part of a spread spectrum receiver of the invention.

FIG. 3A is a block diagram of a digital receiver part of a spread spectrum receiver of the invention, which can be used as the digital receiver part 126 of FIG. 1B. The double lines in the block diagram denote I and Q signals. An incoming signal $S_{in}$ is first multiplied by a local spreading code replica generated with a code generator 207 controlled by a frequency generator 205 using a code mixer 204, which narrows the signal spectrum to the width of data modulation. The signal is then filtered with a low-pass filter 304, and the low-pass filtered signal is decimated with a decimator 306. Next, the obtained signal, which is at a lower sampling frequency, is multiplied by a local carrier replica generated with a frequency generator 203 using a carrier mixer 202, which shifts the signal to the base frequency by removing the carrier frequency and the Doppler shift. The signal obtained from the carrier mixer 202 is filtered further with a low-pass filter 308, and this low-pass filtered signal may be further decimated with a decimator 310 within the bandwidth required by data modulation. Finally, the signal $S_{out}$ obtained from the decimator 310 is applied to carrier and code tracking means 212 and 214, which control the frequency generators 203 and 205, respectively, and to a data demodulator (not shown).

Figure 2A:
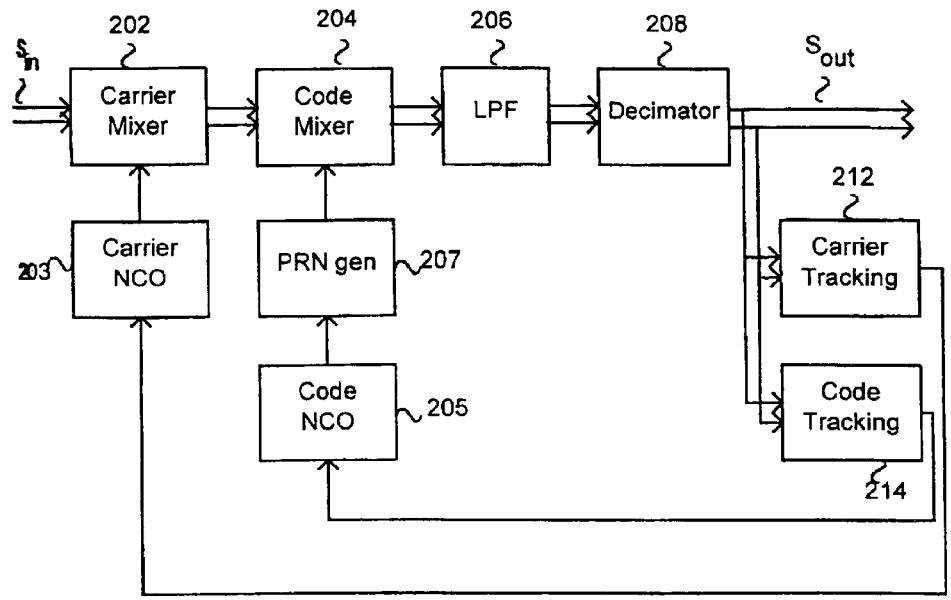
FIGS. 2A and 2B are block diagrams of some prior art digital receiver parts of a spread spectrum receiver.
Figure 2B:
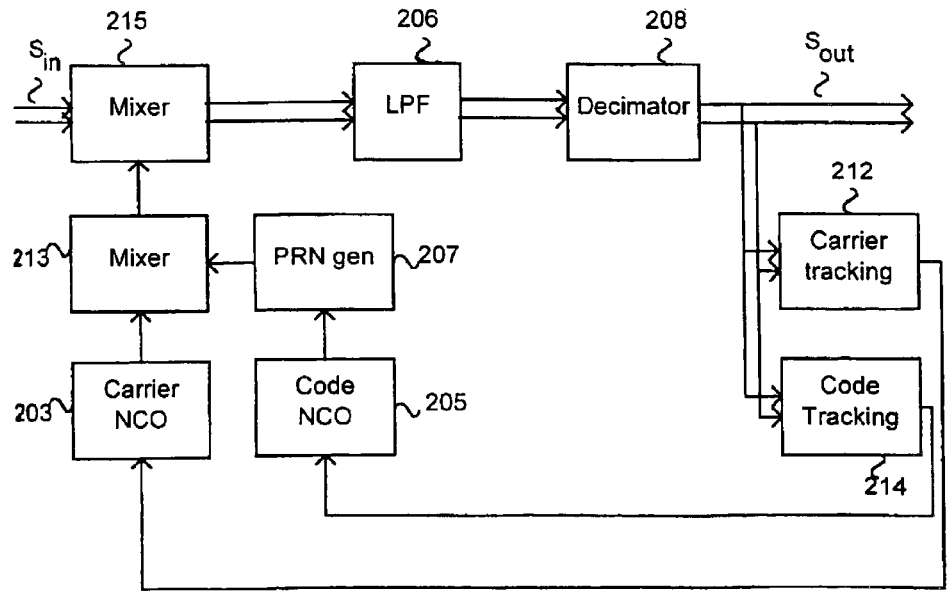
Figure 3B:
FIGS. 3B, 3C and 3D show the spectrum shape of a signal at different points of the digital receiver part of the invention shown in FIG. 3A.
Figure 3C:
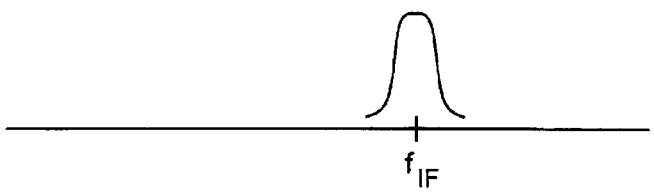
Figure 3D:
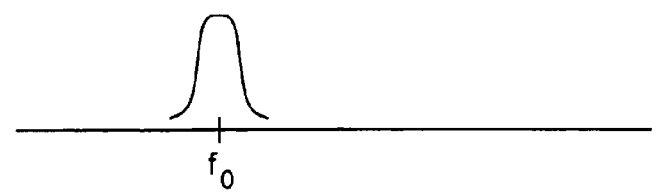

FIG. 3B shows the spectrum shape of a broadband incoming signal $S_{in}$ at an intermediate frequency $f_{IF}$, the shape being the same as the spectrum shape shown in FIG. 2C. At this stage, the sampling frequency of the signal may be in the range 16 MHz, for example. FIG. 3C shows the spectrum shape of a narrowband signal at the intermediate frequency $f_{IF}$ and obtained from the output of the code mixer 204. At this stage the signal is decimated, for example to about 255 kHz. FIG. 30, in turn, shows the spectrum shape of a narrowband signal shifted to the base frequency and obtained from the output of the carrier mixer 202, the shape being the same as the spectrum shape shown in FIG. 2E. At this stage, the sampling frequency may be in the range of 1 kHz, for example. FIGS. 3B to 3D are only intended to illustrate the shape of the spectrum of a signal and not to represent the real spectrum of a signal.

In the structure of FIG. 3A, the signal to be applied to the carrier and code tracking means 212 and 214 can also be taken directly from the output of the carrier mixer 202. The flow-pass filter 308 and the decimator 310 can also be omitted from the structure of the invention, particularly if the bandwidth of the signal obtained from the carrier mixer 202 corresponds to the bandwidth requited by data demodulation, and the signal cannot be subjected to further decimation before the data demodulation is removed. The signals can be low-pass filtered and decimated for instance with 'integrate and dump' type of filters, in which an input signal is integrated for a given time, whereupon the result of the integration is sampled, and the integration is restarted from the beginning. FIG. 3A shows the signal path for only one IQ signal pair, but to implement spreading code tracking, such signal paths are typically needed at least two for two out-of-phase signals.

Figure 4:
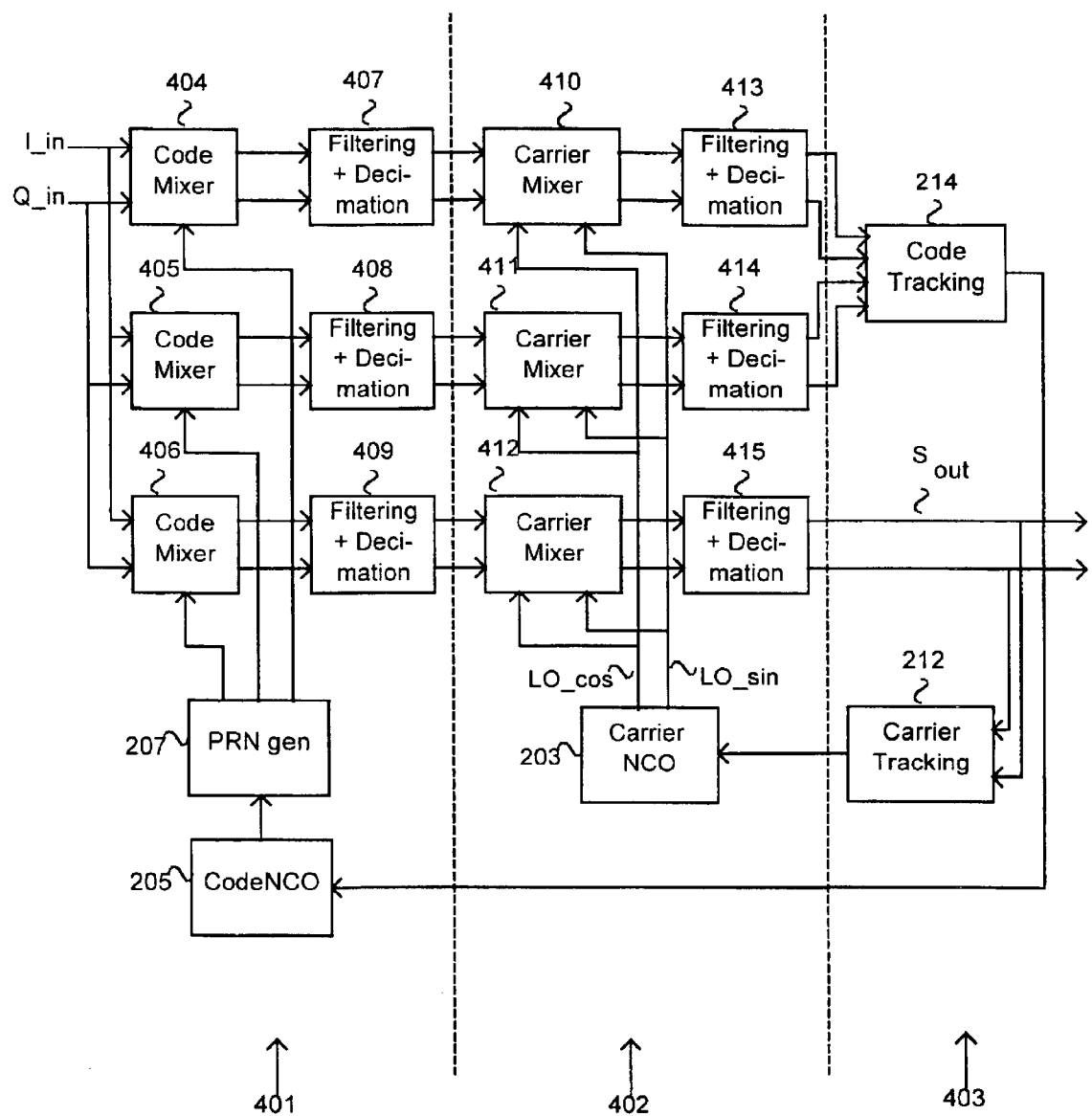
FIG. 4 is a more specified block diagram of a digital receiver part of a spread spectrum receiver of the invention.

FIG. 4 is a more specified block diagram of a digital receiver part of a spread spectrum receiver of the invention, and comprises three signal paths for out-of-phase signals, which comprise separate I and Q components. The receiver part can be divided into a code demodulation part 401, a carrier demodulation part 402 and a processing part 403, which, in turn, can be divided by hardware and software into parts to be implemented in a digital signal processor, for example in such a way that the code demodulation part 401 and the carrier demodulation part 402 are implemented with hardware and the processing part 403 with software.

The code demodulation part 401 comprises three code mixers 404, 405 and 406 for removing the code modulation of out-of-phase signals by means of a local spreading code replica for code tracking. However, the number of out-of-phase signal paths is not limited to three, but there may be fewer or more than three of them. The outputs of the code mixers 404, 405 and 406 are connected to decimation means 407, 408 and 409, respectively, which can be implemented for example as 'integrate and dump' type of filters.

The outputs of the decimation means 407, 408 and 409 are connected to carrier mixers 410, 411 and 412, respectively, of the carrier demodulation part 402, and are used to shift the intermediate frequency of signals to the base frequency by carrying out complex multiplication of I and Q signals by sine-phased and cosine-phased signals LO_sin and LO_cos generated by the local oscillator. The outputs of the carrier mixers 410, 411 and 412 are connected to other decimation means 413, 414 and 415, respectively, which can be implemented for example as 'integrate and dump' type of filters and which further decimate the signal.

The outputs of the decimation means 413 and 414 are connected to the code tracking means 214 of the processor part 403 for performing code tracking. The output of the code tracking means controls the frequency generator 205 of the code demodulation part 401, which generator, in turn, control the code generator 207, which generates out-of-phase spreading code replicas for the code mixers 404, 405 and 406. The inputs of the decimation means 415 are connected to the carrier tracking means 215 of the processing part 403 for performing carrier tracking. The outputs of the carrier tracking means control the frequency generator 207 of the carrier demodulation part 402, which generator generates sine-phased and cosine-phased signals LO_sin and LO_cos for the carrier mixers 410, 411 and 412. From the output of the decimation means 415 is also obtained a carrier and code demodulated signal $S_{out}$, which is further applied to a data demodulator, which is not shown in the figure.

Figure 5:
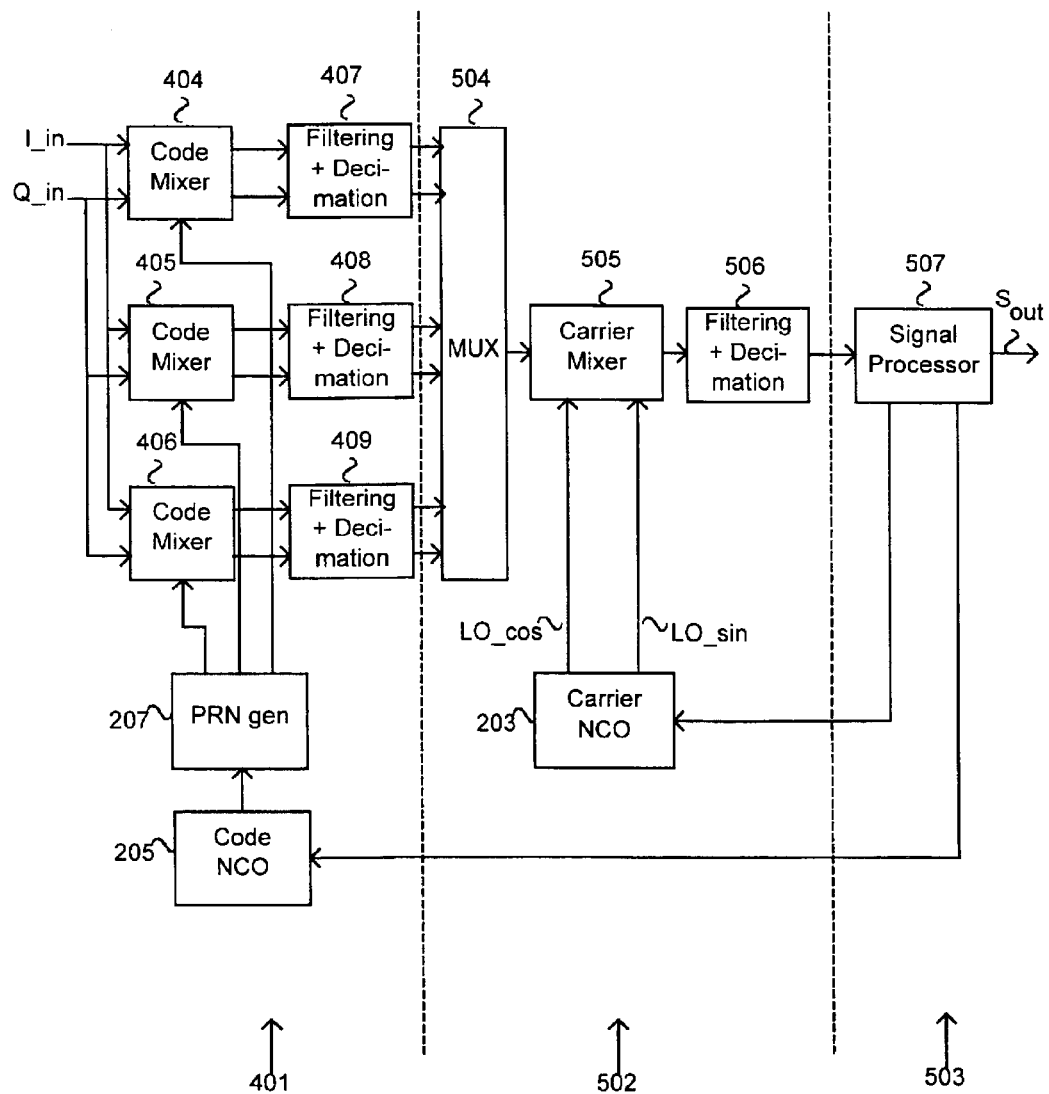
FIG. 5 is a more specified block diagram of another digital receiver part of the spread spectrum receiver of the invention.

FIG. 5 is a more specified block diagram of another digital receiver part of a spread spectrum receiver of the invention, comprising three signal paths for out-of-phase signals, which comprise separate I and Q signals. The receiver part can be divided into a code demodulation part 401, a carrier demodulation part 502 and a processing part 503, which, in turn, can be divided with hardware and software into parts to be implemented in a digital signal processor, for example in such a way that the code demodulation part 401 and the carrier demodulation part 502 are implemented by hardware and the processing part 503 is implemented by software.

The code demodulation part 401 comprises three code mixers 404, 405 and 406 for removing the code modulation of out-of-phase signals by means of a local spreading code replica for code tracking. However, the number of out-of-phase signal paths is not limited to three, but there may be fewer or more than three of them. The outputs of the code mixers 404, 405 and 406 are connected to the decimation means 407, 408 and 409, respectively, which can be implemented for instance as 'integrate and dump' type of filters.

The outputs of the decimation means 407, 408 and 409 are connected to a multiplexer 504 in the carrier demodulation part 502 for implementing time multiplexing of out-of-phase signal paths. The output of the multiplexer 504 is coupled to a carrier mixer 505 for shifting the intermediate frequency of the signals to the base frequency by performing complex multiplication of the I and Q signals by the sine-phased and cosine-phased signals LO_sin and LO_cos generated by the local oscillator. The output of the carrier mixer 505 is connected to other decimation means 506, which can be implemented for example as an 'integrate and dump' type of filter and which further decimate the signal.

The output of the decimation means 506 is coupled to a processing part 503, which is implemented in a signal processor 507 with software and in which the time multiplexed signals are processed to perform code tracking and carrier tracking and to generate a carrier and code demodulated signal $S_{out}$ from the output of the decimation means 506. As an output from the processing part 503, a signal is also obtained that controls the frequency generator 205 of the code demodulation part 401, which generator in turn controls the code generator 207, which generates the out-of-phase spreading code replicas for the code mixers 404, 405 and 406, and a signal, which controls the frequency generator 207 of the carrier demodulation part 502, which generator generates the sine-phased and cosine-phased signals LO_sin and LO_cos for the carrier mixer 505. The carrier and code demodulated signal $S_{out}$ obtained from the output of the signal processor 507 is further applied to a data demodulator, which is not shown in the figure and which frees the signal from data modulation.

It is obvious to a person skilled in the art that as technology advances, the basic idea of the invention can be implemented in a variety of ways. The invention and its embodiments are thus not restricted to the above examples, but may vary within the scope of the claims.

What is claimed is:

1. A digital receiver part of a spread spectrum receiver for processing a digital signal, said receiver part comprising:
   an input for an intermediate-frequency signal;
   an output for outputting a carrier and code demodulated signal;
   a spreading code demodulator part, to whose input is connected the intermediate-frequency signal;
   a carrier demodulator part, which succeeds the spreading code demodulator part on a path of said digital signal; and
   a processing part, which succeeds the carrier demodulator part on said path, and from whose out put the carrier and code demodulator signal is obtained,
   the spreading code demodulator part comprising at least two signal paths, both of which comprise
   a) a code mixer for code demodulation of the digital signal by means of a local spreading code replica, and
   b) first means for lowering a sampling frequency of the digital signal, said first means being arranged to succeed the code mixer on said path, and
   the carrier demodulator part comprising
   a) a carrier mixer for carrier demodulation of the digital signal by means of a local carrier replica, and
   b) a multiplexer for directing signals from outputs of the first means of the spreading code demodulator part in a time multiplexed manner to the carrier mixer.

2. A receiver part as claimed in claim 1, wherein the carrier demodulator part of the receiver part further comprises:
   second means for lowering the sampling frequency of the digital signal, said second means being arranged between said carrier mixer and processing part on said path.

3. A spread spectrum receiver for receiving a spread spectrum signal and for generating a carrier and code demodulated signal, the receiver comprising:
- a radio-frequency part for filtering a desired frequency component from the received spread spectrum signal and for mixing said frequency component to an intermediate frequency, and
- a digital receiver part to which an intermediate-frequency signal is applied and from whose output the carrier and code demodulated signal is obtained, the digital receiver part comprising
- a spreading code demodulator part, to whose input is connected the intermediate-frequency signal, a carrier demodulator part, which succeeds the spreading code demodulator part on the signal path of said intermediate-frequency signal, and a processing part, which succeeds the carrier demodulator part on said path, and from whose output the carrier and code demodulated signal is obtained,
- the spreading code demodulator part comprising at least two signal paths, both of which comprise
  a) a code mixer for code demodulation of the intermediate-frequency signal by means of a local spreading code replica, and
  b) first means for lowering a sampling frequency of the intermediate-frequency signal signal,
- said means being arranged to succeed the code mixer on said path, and the carrier demodulator part comprising
  a) a carrier mixer for carrier of the intermediate-frequency signal by means of a local carrier replica, and
  b) a multiplexer for directing signals obtained from the outputs of the first means of the spreading code demodulator part in a time multiplexed manner to the carrier mixer.

4. A receiver as claimed in claim 3, wherein the carrier demodulator part of the receiver part further comprises
- second means for lowering the sampling frequency of the intermediate-frequency signal, said second means being arranged between said code mixer and processing part on said path.

5. The digital receiver part of claim 1, wherein said code mixer narrows a signal spectrum for said digital signal to a width of data modulation.

6. The digital receiver part of claim 1, wherein said carrier mixer shifts the digital signal to a base frequency by removing a carrier frequency and a Doppler shift.

7. The digital receiver part of claim 1, wherein said first means comprises a low-pass filter and a decimator.

8. The digital receiver part of claim 1, wherein said spreading code demodulator part further comprises:
- a code generator for generating the local spreading code replica;
- a frequency generation means for controlling said code generator; and,
- a code tracking means for controlling the frequency generation means on the basis of an output of the carrier mixer.

9. The digital receiver part of claim 1, wherein said carrier demodulator part comprises:
- a frequency generator for generating the local carrier replica for the carrier mixer, and
- a carrier tracking means for controlling the frequency generator on the basis of an output of the carrier mixer.

10. The spread spectrum receiver of claim 3, wherein said code mixer narrows a signal spectrum for said intermediate-frequency signal to a width of data modulation.

11. The spread spectrum receiver of claim 3, wherein said carrier mixer shifts the intermediate-frequency signal to a base frequency by removing a carrier frequency and a Doppler shift.

12. The spread spectrum receiver of claim 3, wherein said first means comprises a low-pass filter and a decimator.

13. The spread spectrum receiver of claim 10, wherein said spreading code demodulator part further comprises:
- a code generator for generating the local spreading code replica;
- a frequency generation means for controlling said code generator; and,
- a code tracking means for controlling the frequency generation means on the basis of an output of the carrier mixer.

14. The spread spectrum receiver of claim 3, wherein said carrier demodulator part comprises:
- a frequency generator for generating the local carrier replica for the carrier mixer, and
- a carrier tracking means for controlling the frequency generator on the basis of an output of the carrier mixer.

15. A digital receiver of a spread spectrum receiver for processing a digital signal and for outputting a carrier and code demodulated signal, said digital receiver comprising:
- a spreading code demodulator comprising at least two signal paths, both of which include,
  - a code mixer for code demodulation of the digital signal using a local spreading code replica, and
  - a decimator for lowering a sampling frequency of the digital signal, said decimator arranged to succeed the code mixer on said path; and
- a carrier demodulator, which succeeds the spreading code demodulator on said path, the carrier demodulator comprising,
  - a carrier mixer for carrier demodulation of the digital signal using a local carrier replica, and
  - a multiplexer for directing signals from outputs of the decimator in a time multiplexed manner to the carrier mixer.

16. The digital receiver of claim 15, wherein said carrier mixer shifts the digital signal to a base frequency by removing a carrier frequency and a Doppler shift.

17. The digital receiver of claim 16, wherein said decimator includes a low-pass filter and a decimation means.

18. The digital receiver of claim 16, wherein said spreading code demodulator part further comprises:
- a code generator for generating the local spreading code replica;
- a frequency generation means for controlling said code generator; and,
- a code tracking means for controlling the frequency generation means on the basis of an output of the carrier mixer.

19. The digital receiver part of claim 16, wherein said carrier demodulator part comprises:
- a frequency generator for generating the local carrier replica for the carrier mixer, and
- a carrier tracking means for controlling the frequency generator on the basis of an output of the carrier mixer.

* * * * *